(No Model.) 2 Sheets—Sheet 1.
J. P. MARTIN.
COW-MILKING APPARATUS.
No. 331,513. Patented Dec. 1, 1885.
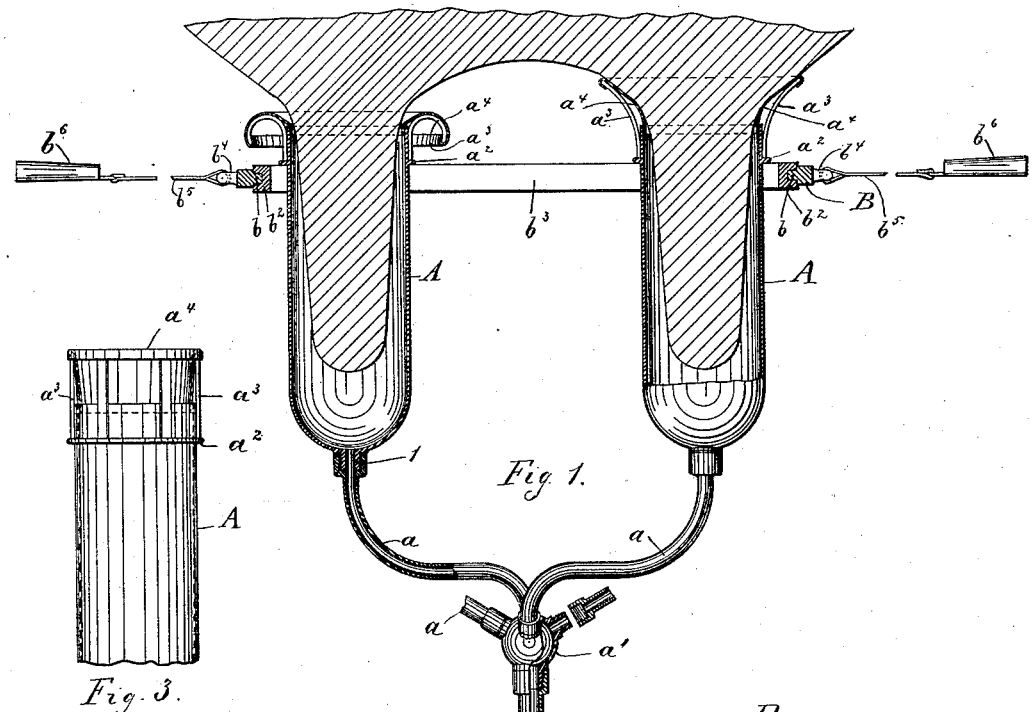
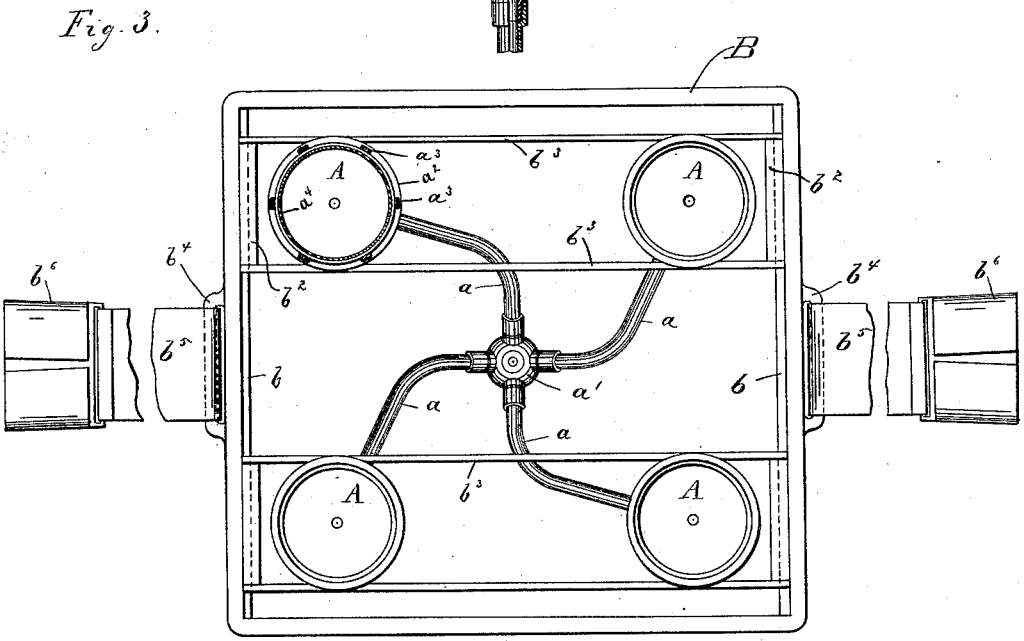
WITNESSES:
L. Holmba[?]
Granville W. Browning
INVENTOR
James P. Martin
BY
Peter T. Fisher
ATTORNEYS (No Model.) 2 Sheets—Sheet 2.

J. P. MARTIN.
COW MILKING APPARATUS.

No. 331,513. Patented Dec. 1, 1885.

WITNESSES:
L. Holmboe
Granville W. Browning

INVENTOR
James P. Martin
BY
Prim & Fisher
ATTORNEYS.

UNITED STATES PATENT OFFICE.

JAMES P. MARTIN, OF ST. PAUL, MINNESOTA.

COW-MILKING APPARATUS.

SPECIFICATION forming part of Letters Patent No. 331,513, dated December 1, 1885.

Application filed July 16, 1884. Serial No. 137,860. (No model.)

*To all whom it may concern:*

Be it known that I, JAMES P. MARTIN, residing at St. Paul, in the county of Ramsey and State of Minnesota, have invented certain new and useful Improvements in Cow-Milking Apparatus; and I do hereby declare the following to be a full, clear, and exact description of said improvements and of the operation thereof, sufficient to enable others skilled in the art to make and use the same.

In Letters Patent of the United States granted to me the 4th day of December, A. D. 1883, No. 289,546, there were shown and described certain improvements in cow-milking appliances, whereby a number of cows might be milked simultaneously at a single setting of the machine parts.

My present invention has for its object to improve and simplify the structure of the teat-covers set forth in said Letters Patent, and also to modify the organization of the exhaust or vacuum pump in such wise as to enable the same to adapt itself automatically to the increasing volume of air which it is necessary to remove at each stroke as the milking proceeds.

In the accompanying drawings, which illustrate the invention, and which are made part of this description, like letters of reference denote like parts of structure throughout.

Figure 4:
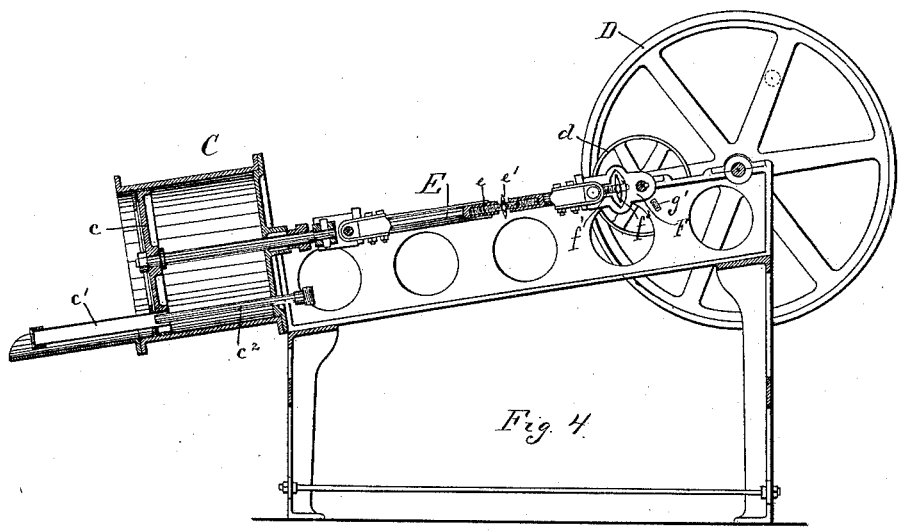
Figure 5:
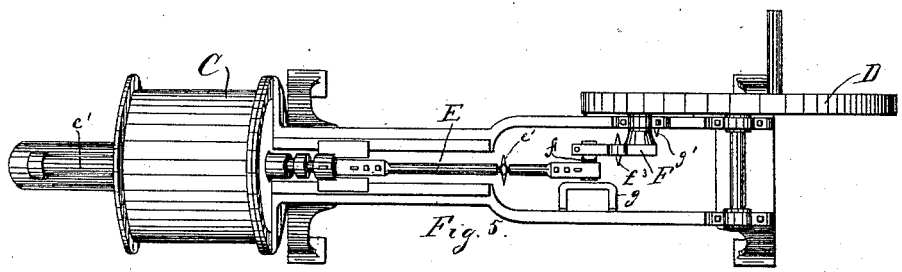
Figure 7:
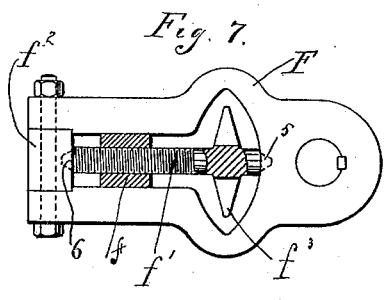
Figure 6:
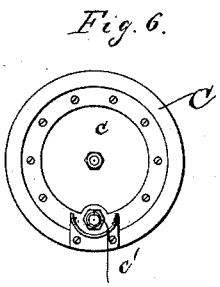
Figure 8:
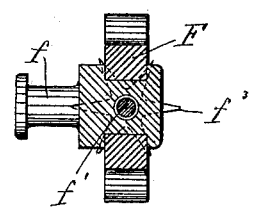

Figure 1 is a sectional view of two of the teat-covers arranged in position within the supporting-frame; Fig. 2, a plan view of a series or set of individual teat-covers sustained within the supporting-case; Fig. 3, a detail view, in elevation, of one of the teat-covers detached, showing the elastic zone or diaphragm; Fig. 4, a longitudinal sectional view, and Fig. 5 a plan view, of the exhaust mechanism and its adjuncts; Fig. 6, an end elevation of the pump-cylinder; Figs. 7 and 8, detail views, partly in section, of crank arm and pin.

The teat-cover A, of gutta-percha, celluloid, papier-maché, or other light and durable material, has the usual outlet-nozzle, A', and tubing $a$ secured thereto, the latter at its opposite end being attached to the bulb $a'$ of the set in any convenient manner to insure a tight joint. In my former patent above referred to it was designed to provide each teat-cover with an expansible air-chamber and pressure-case communicating therewith, whereby, in combination, the teat-cover would be lightly and easily held in place during the milking operation wholly by the air-pressure upon the diaphragm of the air-chamber. By my present invention this expanding chamber and pressure-case are dispensed with, and in lieu thereof a modified form of elastic diaphragm employed, which effects, for all practical purposes, an air-tight joint for the teat-cover, while a supporting frame or case serves to sustain the entire set of teat-covers during the milking operation. By providing this independent support for the sets of teat-covers the teats and udder are relieved from the pressure due to the exhaust, so that the flow of milk is less impeded and proceeds with no distress to the cow. About the teat-cover A, a short distance below its rim, extends the raised bead $a^2$, and at suitable intervals above said bead are arranged in circumferential series the elastic splints $a^3$. These splints $a^3$, formed, preferably, from supple and tough strips of rubber or gutta-percha, are fastened in any convenient way to the teat-cover, and serve, after the manner of stay-ribs, to support the diaphragm $a^4$. Diaphragm $a^4$ consists of strong, light, highly-elastic sheet-rubber attached within to the inner face of the teat-cover and at its folded outer edge to the series of stay-splints $a^3$, which latter are wholly free or independent from said diaphragm, save at the points of attachment stated. By this expedient the diaphragm may be turned down and outward, as shown at the left in Fig. 1, when it is desired to slip the teat-cover into position, and thereafter by reverse movement be lightly sprung, so as to snugly encompass the teat. The elasticity of the diaphragm enables the same to preserve a practically air-tight joint about the teat despite the shrinkage of the latter as the milking proceeds, the stay-splints serving to maintain it in place as against the action of the exhaust, at the same time not interfering with its freedom of elastic movement in adjusting itself to the constant changes in condition of the teat which said diaphragm encompasses.

It should be understood that diaphragm $a^4$, by reason of the light material of which it is composed, collapses about the udder and neck of the teat the moment the exhaust or suction influence is felt at each stroke of the pump, and hence serves effectually to prevent the ingress of air into the teat-cover and beyond. Were the diaphragm stouter—i. e., of heavier body—this collapsible function would not be certainly nor so satisfactorily performed.

To support the individual sets of teat-covers, a light rectangular skeleton frame, B, is provided, having on its inner opposite edges the tongues $b$, which serve as ways to the slides $b^2$. Slides $b^2$ are joined by parallel strips $b^3$, set at such distances apart as to allow teat-covers A to be received and retained by the raised beads $a^2$. The slides being free to move in the tongue-and-groove ways, and each teat-cover also free to move along the strips $b^3$, it is plain that the frame B, carrying the four teat-covers of a set, can be easily and quickly adapted to cows of various-sized udder and various locations of teat.

Lugs $b^4$ on the outer sides of frame B serve as means for attaching the short, light, and highly-elastic straps $b^5$, having spring catch-buckles $b^6$ on their ends, through which may pass the body-strap encircling the cow. This latter strap may be of woven fabric or leather, as desired, and there may be other expedients than the catch-buckles $b^6$ for holding the body-strap and elastic straps $b^5$ together. The system of straps is designed to sustain the frame B and teat-covers in position during the milking operation, the elasticity of the light short straps $b^5$ acting to readjust the frame and covers to the gradual shrinkage of the udder, while at the same time the double straps and buckles—one on each side—enable the evenness in tension to be readily effected and maintained. During this operation the shrinkage of the parts also requires that an increase in the exhaust influence shall occur to correspond with the gradual increase in the volume of air affected thereby. To accomplish this increase in the exhaust action automatically, and in an even and delicate manner, involves certain modifications in the structure of the vacuum-pump described in my former patent, which modifications I will now proceed to describe.

The general operation and organization of the main parts of the exhaust mechanism—that is to say, of the pump-cylinder C, piston-head $c$, pipe $c'$, secured thereto, the tubing-pipe $c^2$, main drive-wheel D, and pump-driving wheel $d$, bearing frictionally thereon, and the catch-lock mechanism to hold the pump drive-wheel for an interval after each stroke—are all of them essentially the same as heretofore detailed in said patent, and need not now be more minutely set forth. The piston-rod E, however, instead of being in one piece, is now divided, the contiguous ends thereof being bored and reversely threaded to receive a threaded spindle, $e$, carrying a sprocket-wheel, $e'$. In like manner the crank-arm F is forked, as shown, and planed true on the faces of the forks, to allow the reduced and squared end of crank-pin $f$ to move back and forth—as in ways—therein. A threaded spindle, $f'$, passes through a hole in the crank-pin and engages therewith, the ends of said spindle $f'$ being received in socket-bearings, as at 5 and 6, to allow for free rotation thereof. Bearing 6 is in distance-block $f^2$, bolted, as shown, to the forks of crank-arm F, and removable therefrom when it is desired to remove or set the crank-pin $f$ in the slideways of the crank-arm. Projections $g$ and $g'$ on the sides of the machine-frame engage, respectively and simultaneously, the sprocket-wheel $e'$ on spindle $e$ and the sprocket-wheel $f^3$ on spindle $f'$ during the upward curve of pump drive-wheel $d$ and crank-arm F—that is, during the back-strokes of the piston. The result of this operation or engagement of sprocket-wheels and projections is to turn the spindles $e$ and $f'$ in their bearings, thereby lengthening the piston-rod E, and at the same instant lengthening crank-arm F, or, more strictly, moving crank-pin $f$ in its bearings to exactly correspond therewith. By this means the piston-head at the end of each back-stroke has advanced slightly toward the open end of the cylinder, and by just so much has increased the exhaust capacity of the pump. At the end of the forward stroke the increase in length of crank-arm F, as described, will allow the piston-head $c$ to close right up to the cylinder-head, notwithstanding the change in length of the piston-rod, so that all of the air will be expelled and the vacuum be established.

The degree of increase at each stroke and the total amount thereof during the milking operation may obviously be determined by the pitch of the screw-threads on spindles $e$ and $f'$, and is necessarily dependent upon the capacity of the pump and the work it is to perform. Precaution being taken to secure the equal and simultaneous lengthening of both connecting-rod and crank-arm, other details may be left to the skill of the operator and the special circumstances of each case. Manifestly, it becomes possible by the means proposed to automatically increase the exhaust action to correspond with the gradual shrinkage of the teats and the gradual increase in the volume of air subject to the vacuum influences.

Having thus described the invention, what I claim as new, and desire to secure by Letters Patent, is—

1. The combination, with the teat-cover, of the outwardly-extending elastic diaphragm projecting therefrom and the stay-splints to support the same, substantially as set forth.

2. The combination, with the teat-cover, and with the outwardly-extending elastic diaphragm connected at one end thereto, of the series of stay-splints joined at their ends to said teat-cover and diaphragm, respectively, but otherwise free from said diaphragm, to permit the free elastic movement thereof, substantially as described.

3. The combination, with the teat-cover sets, of the supporting-frame having elastic connections to sustain the same in position, and to permit automatic adjustment thereof during milking, substantially as set forth.

4. The combination, with the individual teat-covers, and with the milk-receptacle connected thereto, of the separate supporting-frame to removably retain said covers and receptacle, and means, substantially as described, to sustain said frame in position, substantially as set forth.

5. The combination, with the teat-covers, and with the supporting-frame, of the movable slides adapted to receive and retain the teat-covers, substantially as set forth.

6. The combination, with the teat-covers, and with skeleton frame B, having tongues $b$, of slides $b^2$ $b^3$, moving in ways thereon and adapted to sustain the teat-covers, substantially as described.

7. The combination, with the teat-covers, and with the tubing, of the exhaust-pump, the intermittingly-moving drive-wheel therefor, the extensible connecting-rod, and the crank-arm provided with a shifting crank-pin for said connecting-rod, whereby the stroke of the pump may be gradually lengthened as the exhaust proceeds, substantially as set forth.

8. In cow-milking apparatus, the combination, with the teat-covers and tubing, and with the pump-cylinder and piston-head, of the divided connecting-rod having threaded spindle to join the same, the crank-arm, the crank-pin, and spindle engaging said pin, and means, substantially as described, projecting in the paths of the sprocket-wheels on the spindles, to automatically turn the same, substantially as set forth.

9. In cow-milking apparatus, the combination, with the teat covers and tubing, and with crank-arm F, forked, as shown, of the crank-pin adapted to move in ways therein, the threaded spindle $f'$, carrying sprocket-wheel $f^3$ and engaging with said crank-pin, and the distance-block $f^2$, substantially as set forth.

In testimony of what I claim as new, witness my hand this 8th day of July, A. D. 1884.

JAMES P. MARTIN.

Witnesses:
JOSEPH ROTHWELL,
THOS. CAMERON.